Figure 5:
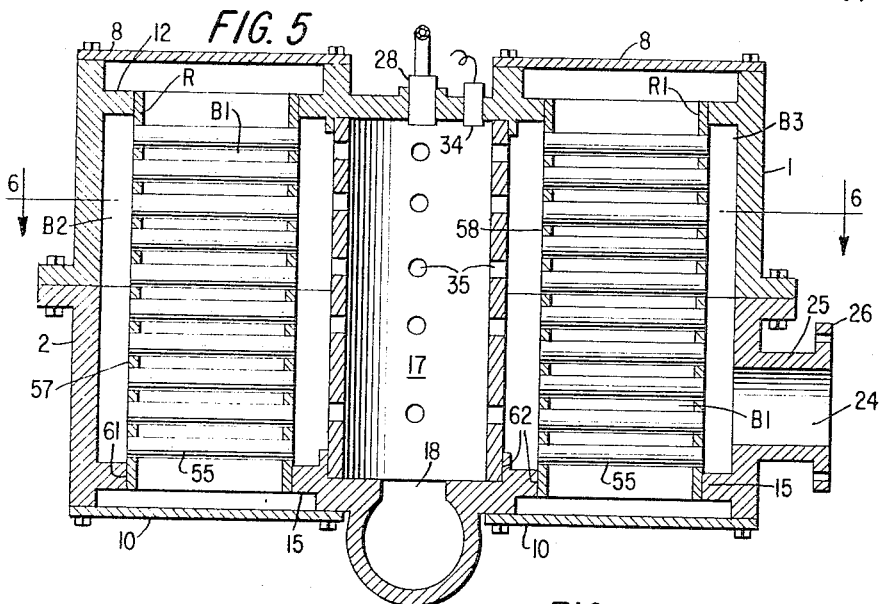

Feb. 28, 1967　　　　　A. C. PETERSON　　　　3,306,039
HEAT REGENERATION SYSTEM FOR GAS TURBINES
Filed Aug. 2, 1965　　　　　　　　　　　　3 Sheets-Sheet 1
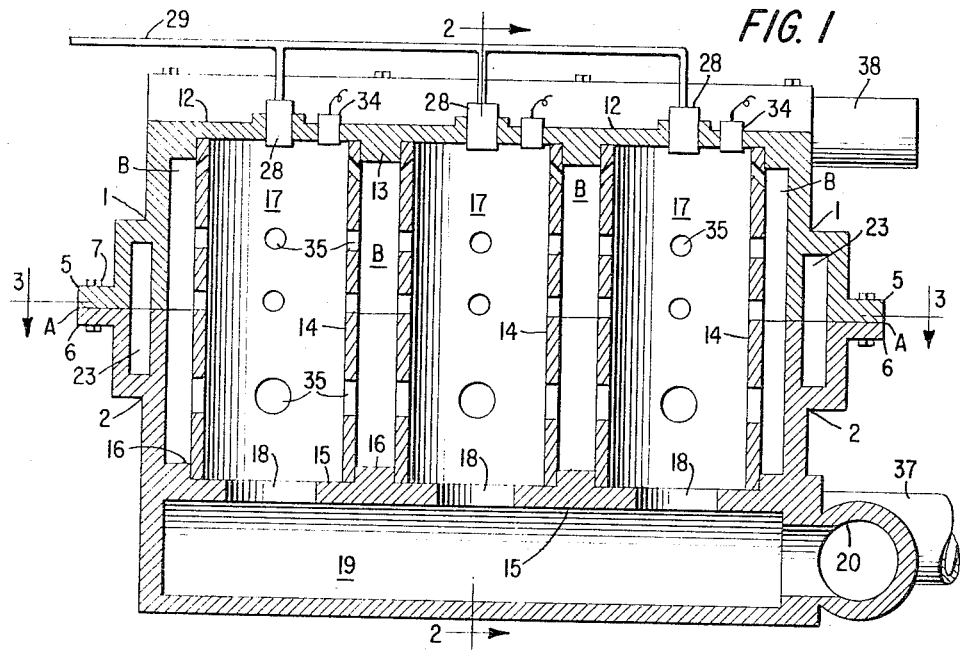
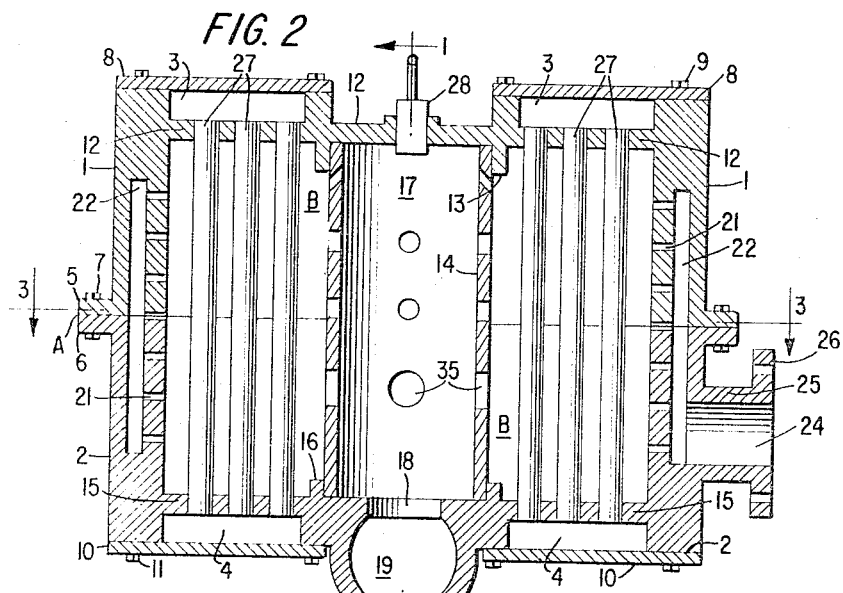
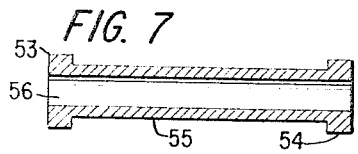
INVENTOR
ADOLPHE C. PETERSON Feb. 28, 1967 A. C. PETERSON 3,306,039
HEAT REGENERATION SYSTEM FOR GAS TURBINES
Filed Aug. 2, 1965
3 Sheets-Sheet 2
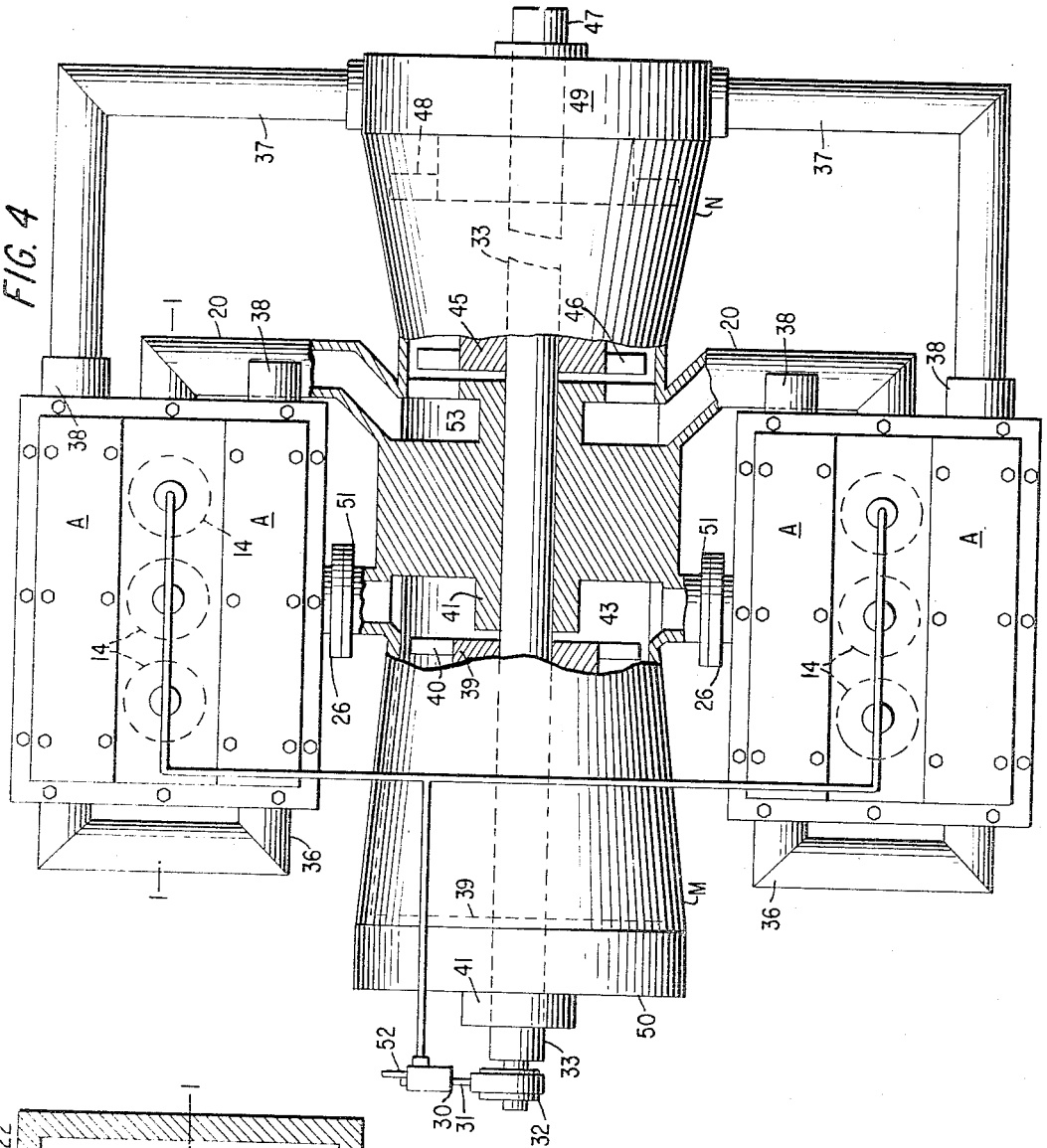
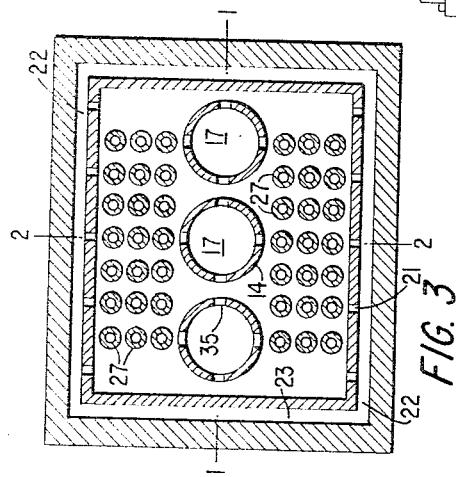
INVENTOR
ADOLPHE C. PETERSON Feb. 28, 1967

A. C. PETERSON 3,306,039

HEAT REGENERATION SYSTEM FOR GAS TURBINES

Filed Aug. 2, 1965

3 Sheets-Sheet 3

INVENTOR
ADOLPHE C. PETERSON

United States Patent Office 3,306,039
Patented Feb. 28, 1967

3,306,039
HEAT REGENERATION SYSTEM FOR GAS TURBINES
Adolphe C. Peterson, 4623 Bruce Ave. S., Minneapolis, Edina, Minn. 55424
Filed Aug. 2, 1965, Ser. No. 482,017
10 Claims. (Cl. 60—39.51)

My invention relates to gas turbines and particularly to a system for regeneration of heat from exhaust gases in operation, and this system is called heat regeneration system for gas turbines.

The invention is chiefly the provision of a system of regeneration in connection with gas turbine means which system shall provide the advantages of regeneration on such a turbine with however, certain advantages such as simplicity in the construction of the entire system, ease of assemblage of the turbine means, less cost in the manufacture of the turbine means, greater ease of maintenance of the turbine means in use, and the possibility of a somewhat improved efficiency in respect of fuel consumed and power output. There has been considerable difficulty in the design of heat regeneration means of a compact form in a turbine system and also considerable difficulty in the construction or manufacture of a turbine having such a system, and there has also been difficulty in the design of such a turbine having such regeneration means in such a manner that it may be used in the space allotted therefor or allottable therefor in the usual form of passenger automobiles and also such automotive means as trucks and tractors and locomotives and marine engines. It is therefore a motivating reason for design of this system that there may be provided a system which shall be capable of use in automotive vehicles without the complication which usually is present in turbine means having regeneration means. The present invention consists chiefly in the arrangement of the regeneration means and its association in the turbine system so that the resulting design shall be simple, less costly in manufacture, less complication in manufacture, and more acceptable for use in such automobile vehicles and appliances, such as passenger cars, trucks, tractors, locomotives. It is, however, none the less, a design that is useful for other purposes such as turbines for stationary power systems, for marine power uses, and for aircraft propulsion systems, and it is contemplated that its use is for all such purposes and the claims are constructed with such use in mind.

The principal devices and combinations of devices comprising my invention are as hereinafter described and as defined in the claims. In the accompanying drawings which illustrate my invention in two different forms like characters refer to like parts through the several views. Referring to the drawings:

FIGURES 1, 2, and 3 are respectively cross-sectional views of a regeneration unit which is otherwise called a gas-forming unit, FIGURE 1 being a vertical cross-section on the lines 1—1 of FIGURES 2 and 3, FIGURE 2 being a vertical cross-section on the lines 2—2 of FIGURES 1 and 3, FIGURE 3 being a horizontal cross-section on the lines 3—3 of FIGURES 1 and 2. In FIGURES 1 and 2 some parts are shown in full side elevation and some parts are broken away. FIGURE 3 is on a scale approximately one-half that of FIGURES 1 and 2.

FIGURE 4 shows a gas turbine system having two units of the kind which is shown in FIGURES 1, 2, 3, assembled with a compressor and turbine such as are used in gas turbine systems. In FIGURE 4 the view is chiefly a plan view on a very much smaller scale than that of FIGURES 1, 2, 3, while some parts are shown in horizontal cross section through the axis of the turbine and compressor of the turbine system and some parts are shown as broken away.

Figure 6:
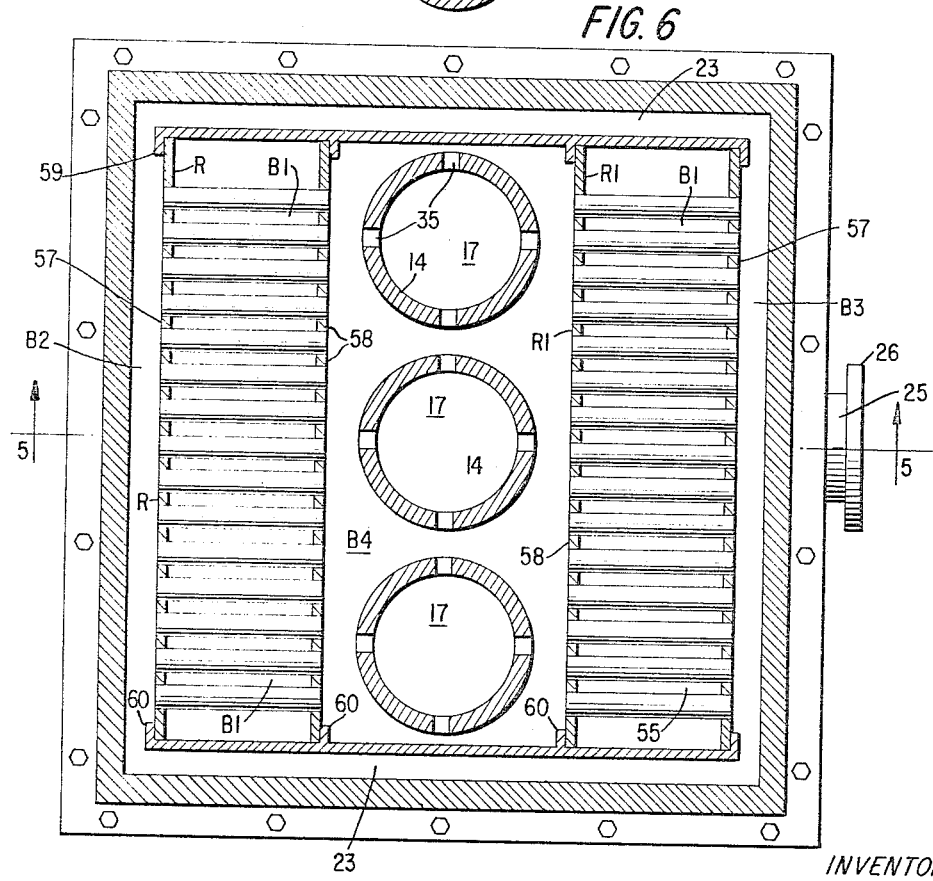

FIGURES 5 and 6 are views in cross section of a modified form of the gas forming unit of the system, FIGURE 5 being a vertical cross section on the line 5—5 of FIGURE 6, FIGURE 6 being a cross-section on a horizontal plane on the line 6—6 of FIGURE 5. This modified form is in general the same as that of the first form shown with the exception, however, that the regenerative surfaces are formed in a modified way and assembled with the unit in a modified way. Some parts in FIGURE 5 are in full side elevation and some parts in FIGURE 6 are in plan view.

FIGURES 7 and 8 show details of elements 55 in FIGURES 5 and 6.

Referring first to the unit which is shown in FIGURES 1, 2, 3, this is a unit which may be used singly in a turbine system or which may be used in plural number in such a system. This unit has an outer or containing casing structure which is formed chiefly by two members, which may be steel stampings, steel or iron castings, or otherwise formed of welded together sections, this being as may be considered best for any particular project. The two designated members are designated 1 and 2, respectively, one an upper and the other a lower section, and the two together with the parts they contain are designated by the letter "A" as one regeneration unit or as otherwise called, one gas forming unit.

The two members 1 and 2 when joined together form a comparatively large space interiorly designated "B" in which the chief parts of the unit are located, as hereinafter described, and on the upper side of the member 1 there are formed two long relatively thin and quite wide spaces designated each as header space 3, and on the under side of the member 2 there are formed two such header spaces each designated as header space 4. The members 1 and 2 have formed with them, at the location where they are to be joined, flanges 5 and 6, respectively, which when assembled are held together by bolts 7 or otherwise firmly united together. The header spaces 3 are each closed at their upper sides by plates 8 bolted to member 1 by bolts 9. The header spaces 4 are each closed at their lower sides by plates 10 bolted to member 2 by bolts 11.

The upper wall 12 of member 1 has formed on its under side three cylindrical short flanges 13 each of which may have inserted into it the extreme upper end of one of the three cylindrical combustion chamber walls or enclosures each of which is designated as 14. The lower wall 15 of the member 2 has formed on its upper side three cylindrical short flanges 16 each of which may have inserted in it the extreme lower end of one of the three cylindrical chamber walls or enclosures 14, this being when the assemblage of the unit is complete.

The upper wall 12 of member 1 forms the top enclosure for all of the three combustion chambers designated each as 17, and the lower wall 15 of the chamber 2 forms the bottom enclosure for all of the three combustion chambers 17, but there is formed in the lower wall 15 three discharge ports, each numbered 18, each of which delivers or discharges into the common conduit 19, the latter conduit being formed in the lower wall structure 15, that is as a formation of or in the member 2, this conduit extending longitudinally and horizontally under the combustion chambers 17 and being closed at one end as shown in FIGURE 1 and being open at the opposite end to a conduit 20 which is connected as hereinafter described to the turbine.

The combustion chamber walls 14, each of them, has formed in the wall and spaced around the combustion chamber associated with it, air apertures or discharges 35 by which air under compression is received from the space B immediately around the walls 14 and that air is passed thereby into the associated combustion chamber 17. The space B at each of its two parallel longitudinal sides receives the compressed air from a multiple number of apertures 21 which are formed in the side walls of the enclosed space B and those apertures 21 receive the compressed air from narrow channels 22 which are formed in each of the two longitudinal parallel side walls of the space B. The channels 22 are connected at their horizontal ends by channels 23 which are formed in the end walls enclosing the space B, and the spaces in those channels all receive the compressed air from the passage 24 which is formed in a connecting member 25 which has a bolted flange 26 by which connection may be made with the turbine as hereinafter described, that is with the compressor thereof.

The header spaces 3 and 4 are located in the unit so that each is offset to one side of the plane wherein are located the three combustion chambers 17. One header space 3 is connected with the opposite (below) header space 4 by means of a considerable number of heat transfer tubes or conduits each of which is designated 27 and each of which is at its top end welded into or otherwise firmly secured into the top wall 12 of member 1 and each of which is at its lower end welded into or otherwise secured firmly into the lower wall 15 of the chamber 2, and the securing is such that there is substantially no leakage as between the header spaces 3 and 4 and the space B. The heat transfer pipes 27 are placed so that each of them is substantially parallel to the outside wall of the combustion chambers 17 and so that it is in heat transfer relation with the compressed air in the space B. Each combustion chamber 17 at its top end has projecting into it the fuel nozzle 28 which is fed fuel from the common fuel line 29 and the fuel pump 30 the plunger of which is reciprocated by connecting rod 31 and eccentric 32 which are formed on an end of turbine shaft 33. Each combustion chamber 17 has a spark plug 34 projecting into it, at its top end and which receives ignition current in any manner.

The head spaces 4 are at one end of each connected by a pipe 36 so that there may be flow from the one header space 4 to the other at the same end by the pipe 36. One header space 4 receives exhaust gases from the exhaust of the turbines (hereinafter described) by means of the exhaust pipe 37. Both of the header spaces 4 discharge exhaust gases therefrom to the lower ends of all the heat transfer pipes 27, that is those at either side of the combustion chamber walls 14 in the space B. The header spaces 3 discharge the exhaust gases which they receive from the heat transfer pipes 27 to exhaust pipes 38 and thereby to ambient air.

In the assembly of one of the gas forming units A any suitable procedure may be adopted but one preferred method will be as follows. The members 1 and 2 (plates 8 and 10 being unattached) are first assembled with the three combustion chamber walls 14, that is such walls 14 are mounted by one end in the flanges 13 (or 16) of one member 1 or 2 and then the other member 1 or 2 is set over the associated other ends of the combustion chamber walls 14 so that the combustion chamber walls 14 rest at their ends within their appropriate flanges (of walls 12 or 15) and the flanges 5 and 6 of the members 1 and 2 will then come together and they may be then bolted together by the bolts 7 so that thus the combustion chamber walls 14 will then be held in their proper places as is shown by the FIGURES 1 and 2. Any means may be used to weld the ends of the walls 14 into places but that is not necessary as it is not necessary that there be a leak proof fit at such ends, as pressures are nearly the same on either side of the walls 14.

After the members 1 and 2 have been united together and with the walls 14 in their places, the heat transfer tubes 27 may then be inserted into their proper places and the ends of each is then welded into the metal of the walls 12 or 15 surrounding the ends or they may be otherwise secured firmly so that there is not any leakage as between the header spaces 3 and 4 and the space B. After the heat transfer tubes 27 have been properly secured in place, the plates 8 and 10 are then bolted into their places as such are shown in the FIGURES 1 and 2. After insertion of the fuel nozzles and spark plugs the unit A will be substantially complete as such a unit.

In FIGURE 4 there is shown a turbine, compressor and gas forming unit assembly, there being there shown two of such gas forming units A. The compressor unit M and turbine unit N are formed in a casing structure as shown, this being substantially of the usual type of such elements, that is an axial flow air compressor (or radial flow) having rotor 39, compressor blades 40 of as many stages as is desired, bearings 41 for the primary turbine shaft 33, compressed air chamber 43, gas pressure chamber 44, primary turbine rotor 45 and its blades 46, secondary turbine shaft 47 and its rotor shaft 48, gas exhaust chamber 49. The turbine unit N is shown as a two shaft unit one rotor driving the air compressor and the other driving the load, such as there may be.

The air compressor M inducts atmospheric air at 50 in the manner as axial flow compressors do usually. One unit A is at one side of the turbine unit and the other unit A is at the other side of the turbine unit, and the passage 24 of each unit A is connected by the flanges 26 to the flanges 51 of the turbine unit N, one at each opposite side. The exhaust chamber 49 of the turbine unit is connected by the exhaust pipes 37, one to one header space 4 of one unit A and the other to the header space 4 of the other unit A. The gas pressure chamber 44 is connected by the pipes 20 with the common conduits 19 of the two units A, so that the hot gases under pressure will then flow to the turbine unit N through pipes 20.

The general operation of the devices is now described. The primary turbine shaft 33 is given initial rotation in any manner as is common in such means, and thereupon the air compressor M will induct air for compression, and the pump 30 will draw fuel from any supply pipe 52, so that combustion of fuel and air will commence in the combustion chambers 17, ignition being supplied as stated. Combustion having been initiated, the gases of combustion at an appropriate temperature of say 1200 or more degrees Fahrenheit (as mixed with air) will then flow from the common conduits 19 by pipes 20 to the gas pressure chamber 44 and will then pass through the guide vanes 53 to the blades 46 of the primary turbine rotor and then to the blades of the secondary turbine shaft 47 and to exhaust chamber 49 and thereby and by pipes 37 to the header spaces 4, one of each unit A, and the exhaust gases will then pass to all the pipes 27 in divided streams and thereby to the header spaces 3 and by these spaces to the exhaust pipes 38 and thus to atmosphere, ambient air. In the passage to heat transfer pipes 27 the hot exhaust gases at a temperature which may be say eight or nine hundred degrees or more Fahrenheit, give up heat to the compressed air in the space B surrounding all the pipes 27 and thus that compressed air is considerably heated and passes with such acquired heat to combustion chambers 17 through the apertures 35 of walls 14. In combustion chambers 17 air will be combusted with the fuel from the fuel nozzles and a surplusage of air will be received from apertures 35 so that the resulting gases will be at an appropriate temperature as they pass to the turbine unit N by pipes 20.

It will be seen that the compressed air passes horizontally that is from the apertures 21 laterally of walls 14 and thereby transversely of pipes 27 exteriorly thereof. I have shown the system as being an axial flow compressor and axial flow turbines, but it is contemplated that any type of rotors, compressor and turbines, may be used, such as centrifugally operating devices or centripetal devices or other devices, that is radially inflow turbine rotors or axial flow turbine rotors.

Referring now to the modified form which is shown in FIGURES 5 and 6, this form is generally similar in all respects to the form as shown in FIGURES 1, 2, 3, with the exception that the gas forming unit (FIGURES 5, 6) has a modified form or type of heat transfer pipes or elements, such means in this form being such as to have generally a reverse system of flow within and without the elements of the heat transfer units, that is so that the compressed air flow is interiorly of such elements. And it is also different in that the elements or tubes are assembled as a unit in a different way, and in such manner that the heat transfer means itself is or may be formed as a unit or units separately from the other structure of the device, that is so so that such heat transfer units may be fully constructed and then assembled as a unit into the other structure of the device as described. The heat transfer means of the device is or may be constructed in the manner in which the automotive radiators as usually used in automobiles for cooling of the water to cool engine cylinders of piston engines are constructed.

FIGURE 7 shows the type of elements which may be used in the make-up of the heat transfer unit and in this figure there is illustrated the type of elements which is usually used in the formation of automotive type cooling radiators and this element has at each end formed as a part of the element (by any means) a hexagonal shaped header that at one end designated 53 and that at the opposite end designated 54. The element has formed as a part thereof a tubular portion 55 which is of somewhat less transverse dimension than the headers 53, 54, there being a passage 56 passing entirely through the headers 53, 54 and the tubular portion 55. By this arrangement or form of each element of the heat transfer unit a considerable number of such elements may be piled together so that the headers at each end in the total form what is in the nature of a continuous wall through which there are the passages 56 in large number, and so that they will cause of the difference in transverse dimension of each element form the exterior space, designated as B1 which is exteriorly of the tubular portions 55 but within the two opposite side walls of the heat transfer unit which is formed by the headers 53, 54, when joined together. The header portions of the unit are when so placed together welded together in each side wall thus formed so that by such welding together there is formed a structure having side walls generally designated 57, 58, by which there is prevented any leakage or flow from the spaces B2, B3, when the unit is assembled in place, FIGURES 5, 6, by placing within the flanges 59, 60, and, at the ends (top and bottom) in the large apertures 61, 62, which are formed in the walls 12 and 15 of the members 1 and 2, respectively. Such top and bottom ends of the completed heat transfer units may be welded into place or simply shrunk into place, or secured by any appropriate means as by bolting or crimping or otherwise as may be well known in mechanical manufacture.

Thus in this form the heat transfer units, generally designated R and R1, may be formed as described, separately as units, and may then be assembled as indicated in the complete device, so that the units R, R1, together with the other means as described, with reference to FIGURES 1, 2, 3, form a device functioning in results as does the device illustrated in FIGURES 1, 2, 3, and FIGURE 4. In such complete device (using this modified form of unit R, R1), the compressed air from the compressor will enter the spaces B2, B3, from the passage 24 and channels 23, and the compressed air will flow from such spaces B2, B3, through the large number of passages 56 in each unit R, R1, to the space designated specifically as B4 which is immediately adjacent to and around the walls 14 of the combustion chambers 17, and the compressed air as thus heated will flow through the apertures 35 and to the combustion chambers 17. In that passage of air (compressed) it is heated by the flow of exhaust gases from the turbines through the pipes 37 to the header spaces 4 and therefrom to the space B1 which is within the walls 57, 58, and exteriorly of the tubular portions 55, so that it enters the combustion chambers with a considerable accumulated heat received from the turbine exhaust gases.

It should be noted that the division of the combustion processes into a plural number of combustion chambers placed in line in a plane, enables a construction which is well suited for location in spaces in automotive vehicles of various kinds and that by the location of heat transfer means in units parallel to the plane of the plural number of combustion chambers provides a compact means or method of forming the necessary heat transfer means in automotive vehicles.

While I have shown particular devices and combinations of devices in the illustration of my invention, I contemplate and intend that other detailed devices and combinations of devices may be used in the realization of my invention without departing from the scope and contemplation thereof, and its comprehension.

What I claim is:

1. In a pressurized gas forming means for gas turbines: a containing casing structure formed chiefly of two casing header structures, these structures being spaced apart and parallel each to the other and forming with enclosing side walls an interior space intermediately of said casing header structures; an apertured combustion chamber wall to laterally surround within it a combustion chamber, said combustion chamber wall being substantially as long as the distance between said casing header structures and mounted by one end of said combustion chamber wall in the one casing header structure and by the other end in the other casing header structure, the apertures in the combustion chamber wall providing for flow of pressurized air into the combustion chamber from said interior space; heat transfer matrix means at one side of said combustion chamber wall and heat transfer matrix means at the other side of said combustion chamber wall, each said heat transfer matrix means extending in said interior space from one said casing header structure to the other to permit sustained flow of exhaust gas therethrough from an exhaust gas conduit connected to a turbine gas conduit means and flow to exhaust discharge means; a compressed air conduit means forming connection for compressed air flow from an air compressing means and to air reception chambers one at the outwardly exterior side of one said heat transfer matrix means and the other at the outwardly exterior side of the other said heat transfer matrix means, the arrangement being such that pressurized air from each said air reception chamber flows therefrom transversely of the adjacent heat transfer matrix means and to space exteriorly of said combustion chamber wall and through said apertures to the combustion space interiorly of said combustion chamber wall; the one said casing header structure having therein fuel injection means for flow of fuel to said combustion space and the other casing header structure having an aperture between said combustion space and a pressurized gas conduit connected to a turbine gas intake; means delivering fuel to said fuel injection means and means for ignition in said combustion space.

2. The device as defined in claim 1 and: the one casing header structure having formed therein a combustion gaseous fluid conduit forming part of the connections to the turbine intake, the other casing header structure having formed therein exhaust gas collecting means to receive exhaust gas after heat transfer and from the adjacent ends of matrixes to pass exhaust gases to atmosphere.

3. The device as defined in claim 1 and: each said heat transfer matrix means being composed of a plural number of exhaust gas conveying tubes formed to have flow therethrough substantially parallel in direction to flow in said combustion chamber.

4. The device as defined in claim 1 and: each said heat transfer matrix means being formed of a plural number of tubes for conveying pressurized air flow from said air reception chamber associated and to the interior space immediately surrounding said combustion chamber wall, the structure of said heat transfer matrix means being such as to prevent flow of exhaust gases from space exteriorly of said tubes the latter named space being such as to permit flow from the conduit in one header structure to the conduit formed in the other header structure.

5. In pressurized gas forming means for gas turbines: containing casing structure formed chiefly of two casing header structures, these casing header structures being spaced apart and parallel each to the other and forming with enclosing side walls an interior space intermediately of said casing header structures; a plural number of combustion chamber units each formed of an apertured combustion chamber wall surrounding within it a combustion chamber space, said combustion chamber wall being substantially as long as the distance between said casing header structures and mounted by one end of said combustion chamber walls in the one casing header structure and by the other end in the other casing header structure, the apertures in the combustion chamber wall providing for flow of pressurized air into the combustion chamber from said interior space; heat transfer matrix means located at one side of said combustion chamber units and heat transfer matrix means located at the other side of said combustion chamber units, each said heat transfer matrix means extending in said interior space from one said casing header structure and to the other casing header structure to permit sustained flow of exhaust gas therethrough from an exhaust gas conduit connected to a turbine exhaust means and flow to an exhaust gas discharge means; a compressed air conduit means forming connection for compressed air flow from an air compressing means and to air reception chambers one at the outwardly exterior side of one said heat transfer matrix means and the other at the outwardly exterior side of the other said heat transfer matrix means, the arrangement being such that pressurized air from each said air reception chamber flows therefrom transversely of the adjacent heat transfer matrix means and to space exteriorly of said combustion chamber units and through said apertures to the combustion spaces interiorly of said combustion chamber walls; the one said casing header structure having therein fuel injection means, one for each combustion chamber unit, for flow of fuel to the combustion spaces in said combustion chamber units; the other casing header structure having for each said combustion chamber unit an aperture between the associated combustion space and a pressurized gas conduit connected to a turbine gas intake; means delivering fuel to each said fuel injection means and means for ignition in each said combustion chamber unit; the one said casing header structure providing closure for one end of each said combustion space and the other casing header structure providing closure for the opposite end of each said combustion space, except as connection communication is stated to be provided.

6. The device as defined in claim 5 and: the one casing header structure having formed therein combustion fluid conduit means forming part of the connection to the turbine intake, the other casing header structure having formed therein exhaust gas collecting space to receive exhaust gases after heat transfer and from the adjacent end of matrices to pass exhaust gases to atmosphere.

7. The device as defined in claim 5 and: each said heat transfer matrix means being composed of a plural number of exhaust gas conveying tubes formed to have flow therethrough substantially parallel in direction to flow in said combustion chamber units.

8. The device as defined in claim 5 and: each said heat transfer matrix means being formed of a plural number of tubes for conveying pressurized air flow from said air reception chamber associated and to the interior space immediately surrounding said combustion chamber units, the structure of each said heat transfer matrix being such as to prevent flow of exhaust gases from space exteriorly of said tubes, the latter named space being such as to permit flow from the conduit in one header structure to the conduit formed in the other header structure.

9. The device as defined in claim 1 and: the said compressed air conduit means including air conduits formed in the lateral side structure of said casing structure to form means for conveyance of pressurized air to the laterally most remote portions of said air reception chambers.

10. The device as defined in claim 1 and: each said header structure being formed to have depressed chambers formed on one side of the header structure, covers for said depressed spaces being provided for attachment to the outside side of the header structure such spaces in the header structure providing the passage means for flow of the exhaust gases to and from said heat transfer matrix means.

References Cited by the Examiner

UNITED STATES PATENTS 3,079,754   3/1963   Kolb _____ 60—39.51

MARK NEWMAN, *Primary Examiner.*

RALPH D. BLAKESLEE, *Examiner.*